United States Patent
Bland et al.

(10) Patent No.: US 7,287,138 B2
(45) Date of Patent: Oct. 23, 2007

(54) LOW COST AND HIGH RAS MIRRORED MEMORY

(75) Inventors: Patrick Maurice Bland, Raleigh, NC (US); Thomas Basil Smith, III, Wilton, CT (US); Robert Brett Tremaine, Stormville, NY (US); Michael Edward Wazlowski, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 568 days.

(21) Appl. No.: 10/859,826

(22) Filed: Jun. 3, 2004

(65) Prior Publication Data

US 2004/0230767 A1    Nov. 18, 2004

Related U.S. Application Data

(62) Division of application No. 09/652,752, filed on Aug. 31, 2000, now Pat. No. 6,766,429.

(51) Int. Cl.
*G06F 12/00* (2006.01)
(52) U.S. Cl. .......................... 711/162; 714/6
(58) Field of Classification Search ................ 711/162; 714/6; 707/204
See application file for complete search history.

(56) References Cited

U.S. PATENT DOCUMENTS

| | | | | |
|---|---|---|---|---|
| 5,784,548 A | * | 7/1998 | Liong et al. | 714/6 |
| 5,928,367 A | * | 7/1999 | Nelson et al. | 714/6 |
| 6,442,659 B1 | * | 8/2002 | Blumenau | 711/162 |

* cited by examiner

*Primary Examiner*—Hiep T. Nguyen
(74) *Attorney, Agent, or Firm*—Scully, Scott, Murphy & Presser, P.C.; Derek S. Jennings, Esq.

(57) ABSTRACT

An architecture, method and apparatus for a data processing system having memory compression and two common memories forming either a single unified memory, or a dual memory system capable of continuous operation in the presence of a hardware failure or redundant "duplex" computer maintenance outage, without the cost of duplicating the memory devices. A memory controller employs hardware memory compression to reduce the memory requirement by half, which compensates for the doubling of the memory needed for the redundant storage. The memory controller employs error detection and correction code that is used to detect storage subsystem failure during read accesses. Upon detection of a fault, the hardware automatically reissues the read access to a separate memory bank that is logically identical to the faulty bank. After a memory bank is identified as faulty, the memory controller precludes further read access to the bank, permitting replacement without interruption to the application or operating system software operation.

4 Claims, 6 Drawing Sheets

300

LOW COST AND HIGH RAS MIRRORED MEMORY

RELATED APPLICATION

This application is a divisional of U.S. application Ser. No. 09/652,752, filed Aug. 13, 2000 now U.S. Pat. No. 6,766,429.

BACKGROUND OF THE INVENTION

1. Technical Field of the Invention

This invention relates in general to the field of memory architecture in computer systems, and more specifically to an improved method and apparatus for high availability redundant memory.

2. Background

Computer systems generally consist of one or more processors that execute program instructions stored within a medium. This mass storage medium is most often constructed of the lowest cost per bit, yet slowest storage technology, typically magnetic or optical media. To increase the system performance, a higher speed, yet smaller and more costly memory, known as the main memory, is first loaded with information from the mass storage for more efficient direct access by the processors. Even greater performance is achieved when a higher speed, yet smaller and more costly memory, known as a cache memory, is placed between the processor and main memory to provide temporary storage of recent/and or frequently referenced information. As the difference between processor speed and access time of the final storage increases, more levels of cache memory are provided, each level backing the previous level to form a storage hierarchy. Each level of the cache is managed to maintain the information most useful to the processor.

Often more than one cache memory will be employed at the same hierarchy level, for example when an independent cache is employed for each processor. Caches have evolved into quite varied and sophisticated structures, but always address the tradeoff between speed and both cost and complexity, while functioning to make the most useful information available to the processor as efficiently as possible.

Recently, cost reduced computer system architectures have been developed that more than double the effective size of the main memory by employing high speed compression/decompression hardware based on common compression algorithms, in the path of information flow to and from the main memory. Processor access to main memory within these systems is performed indirectly through the compressor and decompressor apparatuses, both of which add significantly to the processor access latency costs.

Large high speed cache memories are implemented between the processor and the compressor and decompressor hardware to reduce the frequency of processor references to the compressed memory, mitigating the effects of the high compression/decompression latency. These caches are partitioned into cache lines, equal in size to the fixed information block size required by the compressor and decompressor.

Referring to FIG. 1, a block diagram of a prior art computer system 100 is shown. The computer system includes one or more processors 101 connected to a common shared memory controller 102 that provides access to a system main memory 103. The shared memory controller contains a compressor 104 for compressing fixed size information blocks into as small a unit as possible for ultimate storage into the main memory, a decompressor 105 for reversing the compression operation after the stored information is later retrieved from the main memory, and write queue 113 for queuing main memory store request information block(s) destined for the compressor. The processor data bus 108 is used for transporting uncompressed information between other processors and/or the shared memory controller. Information may be transferred to the processor data bus 108 from the main memory 103, either through or around the decompressor 105 via a multiplexor 111. Similarly, information may be transferred to the main memory 103 from the processor data bus 108 to the write buffer and then either through or around the compressor 104 via a multiplexor 112.

The main memory 103 is typically constructed of synchronous dynamic random access memory (SDRAM) with access controlled by a memory controller 106. Scrub control hardware within the memory controller can periodically and sequentially read and write SDRAM content through error detection and correction logic for the purpose of detecting and correcting bit errors that tend to accumulate in the SDRAM. Addresses appearing on the processor address bus 107 are known as Real Addresses, and are understood and known to the programming environment. Addresses appearing on the main memory address bus 109 are known as Physical Addresses, and are used and relevant only between the memory controller and main memory SDRAM. Memory Management Unit (MMU) hardware within the memory controller 106 is used to translate the real processor addresses to the virtual physical address space. This translation provides a means to allocate the physical memory in small increments for the purpose of efficiently storing and retrieving compressed and hence, variable size information.

The compressor 104 operates on a fixed size block of information, say 1024 bytes, by locating and replacing repeated byte strings within the block with a pointer to the first instance of a given string, and encoding the result according to a protocol. This process occurs through a byte-wise compare over a fixed length and is paced by a sequence counter, resulting in a constant completion time. The post process output block ranges from just a few bytes to the original block size, when the compressor could not sufficiently reduce the starting block size to warrant compressing at all. The decompressor 105 functions by reversing the compressor operation by decoding resultant compressor output block to reconstruct the original information block by inserting byte strings back into the block at the position indicated by the noted pointers. Even in the very best circumstances, the compressor is generally capable of only ¼–½ the data rate bandwidth of the surrounding system. The compression and decompression processes are naturally linear and serial too, implying quite lengthy memory access latencies through the hardware.

Referring to FIG. 2, prior art for partitioning the main memory is shown 200. The main memory 205 is a logical entity because it includes the processor(s) information as well as all the required data structures necessary to access said information. The logical main memory 205 is physically partitioned from the physical memory address space 206. In many cases, the main memory partition 205 is smaller than the available physical memory to provide a separate region to serve as a cache with either an integral directory, or one that is implemented externally 212. It should be noted that when implemented, the cache storage may be implemented as a region 201 of the physical memory 206, a managed quantity of uncompressed sectors, or as a separate storage array that may be directly accessed by the processor buses 107 and 108. In any case, when implemented, the cache controller will request accesses to the main memory in a similar manner as a processor would if the cache were not present.

The logical main memory 205 is partitioned into the sector translation table 202, with the remaining memory being allocated to sector storage 203 which may contain compressed or uncompressed information, free sector pointers, or any other information as long as it is organized into sectors. The sector translation table region size varies in proportion to the real address space size which is defined by a programmable register within the system. Particularly, equation 1) governs the translation of the sector translation table region size as follows:

$$\text{sector\_translation\_table\_size} = \frac{\text{real\_memory\_size}}{\text{compression\_block\_size}} \cdot \text{Translation\_table\_entry\_size} \quad (1)$$

Each entry is directly mapped to a fixed address range in the processor's real address space, the request address being governed in accordance with equation 2) as follows:

$$\text{sector\_translation\_table\_entry\_address} = \frac{\text{real\_address}}{\text{compression\_block\_size}} \cdot \text{translation\_table\_entry\_size} + \text{offset\_size} \quad (2)$$

For example, a mapping may employ a 16 byte translation table entry to relocate a 1024 byte real addressed compression block, allocated as a quantity 256 byte sectors, each located at the physical memory address indicated by a 25-bit pointer stored within the table entry. The entry also contains attribute bits 208 that indicate the number of sector pointers that are valid, size, and possibly other information. Every real address reference to the main memory causes the memory controller to reference the translation table entry 207 corresponding to the real address block containing the request address 210. For read requests, the MMU decodes the attribute bits 208, extracts the valid pointer(s) 209 and requests the memory controller to read the information located at the indicated sectors 204 from the main memory sectored region 203. Similarly, write requests result in the MMU and memory controller performing the same actions, except information is written to the main memory.

However, if a write request requires more sectors than are already valid in the translation table entry, then additional sectors need to be assigned to the table entry before the write may commence. Sectors are generally allocated from a list of unused sectors that is dynamically maintained as a stack or linked list of pointers stored in unused sectors. There are many possible variations on this translation scheme, but all involve a region of main memory mapped as a sector translation table and a region of memory mapped as sectors. Storage of these data structures in the SDRAM based main memory provides the highest performance at the lowest cost, as well as ease of reverting the memory system into a typical direct mapped memory without compression and translation.

It is highly desirable to provide redundant main memory for the purpose of having a system be tolerant of a memory failure, as well as the capability for memory removal and replacement without interruption to application or operating system software operation. Architectures with these attributes are generally cost prohibitive for application in all but a few select niches. One architecture of this type is disclosed in Fault-Tolerant Computer System Design, by Dhiraj K. Pradhan (Prentice Hall), 1996, pp 15-18. Therefore, the need and opportunity has arisen for an improved architecture and method of data management in a processing memory system, to provide a highly reliable and maintainable main memory array, without significant cost or complexity.

SUMMARY OF THE INVENTION

It is an object of the invention to provide a processing system having a highly reliable and maintainable main memory, without the added cost normally incurred to incorporate redundant memory, for the purpose of tolerating and repairing faults within the main memory without interruption of application or operating system software operation.

It is a further object of the invention to provide an architecture, method and apparatus to provide a compressed data memory system having a main memory array that is configurable as a duplex, where identical content is maintained within each memory bank, such that any uncorrectable data error detected upon read access to a given bank, may be reread from the other bank with the intent of receiving data without error. Operational modes may be selected to permit either memory bank to be configured as a back-up, to permit physical removal and replacement of the bank, and for re-initialization and synchronization of the memory state for the purpose of regaining use of the memory. The cost of duplicating the memory is balanced by the savings from compressing the memory content, thereby achieving the high reliability function at a negligible cost.

According to the invention, a conventional SDRAM storage array is partitionable into two identical banks, comprised of user replaceable entities containing SDRAM with electrically isolated logic interfaces. All activity may be configured to occur concurrently to maintain "lock-step" synchronization between the two banks. Although memory read accesses always occur at both banks, an electrical isolation mechanism provides a means for the memory controller to selectively receive data from only one of the two memory banks, known as the primary bank, whereas the "ignored" bank is known as the back-up bank. However, write accesses always occur at both banks.

The conventional memory controller functions are designed with special consideration for duplex memory operation, including: A memory scrub controller mode to immediately scrub the entire memory address space by reading and then writing the content back for the purpose of initializing a back-up memory bank with the content from the primary bank. Further, the scrub controller alternates normal memory scrub read access between the two banks to insure the back-up bank has not accumulated any content errors. Lastly, the memory controller can be configured to fail-over to the back-up bank from the primary bank, upon detection of an uncorrectable error from the ECC in the data read path. The fail-over process involves swapping the bank configuration (back-up bank becomes primary bank and vice versa), and reissuing the read operation to receive the reply data from the new primary bank. Several "duplex" modes exist, permitting manual selection, automatic fail-over trip event, or automatic fail-over toggle event.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

Figure 1:
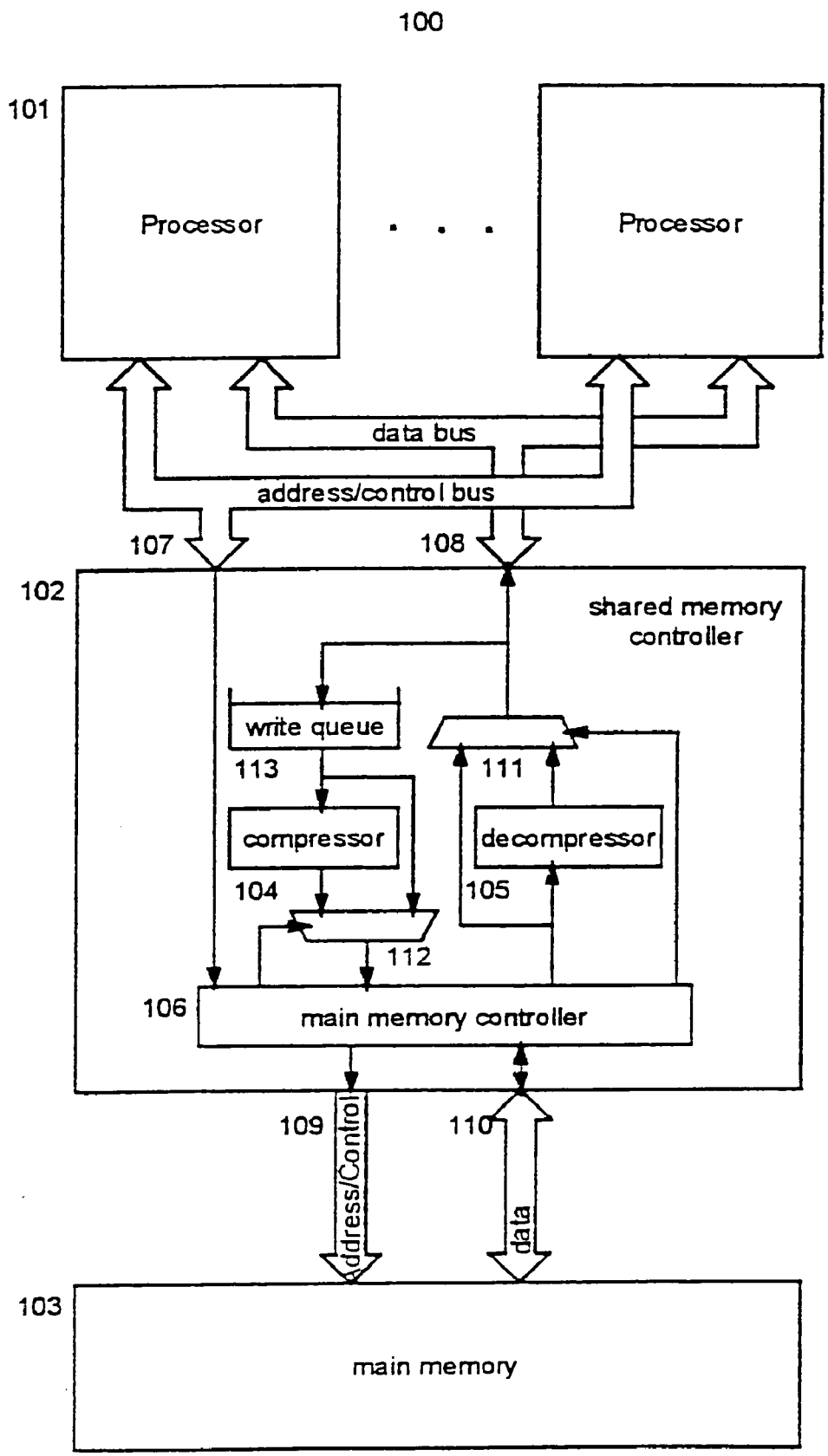
FIG. 1 illustrates a block diagram of a prior art computer having a cache and a main memory system with hardware compressor and decompressor.
Figure 2:
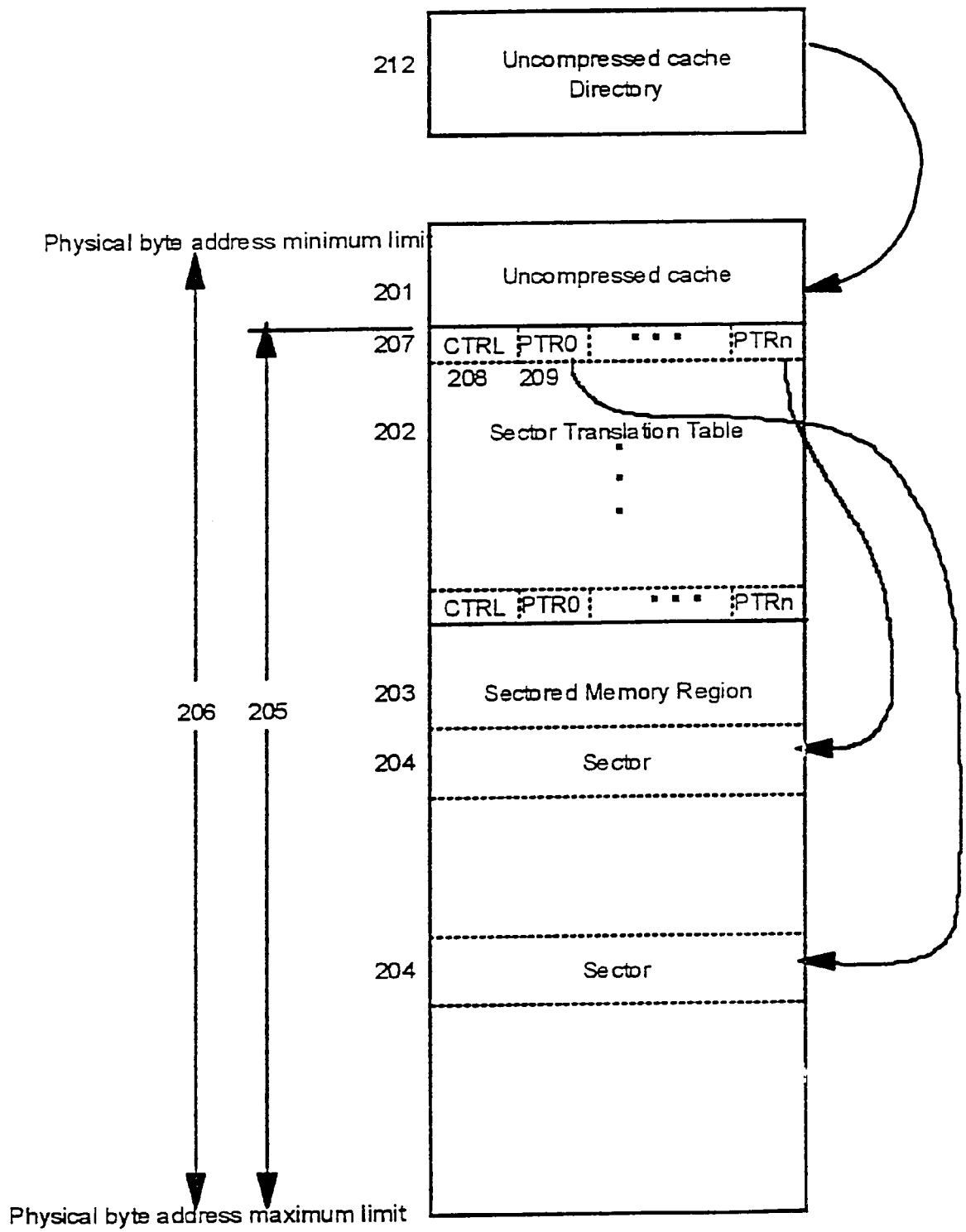
FIG. 2 illustrates prior art for a memory address space partitioning.
Figure 3:
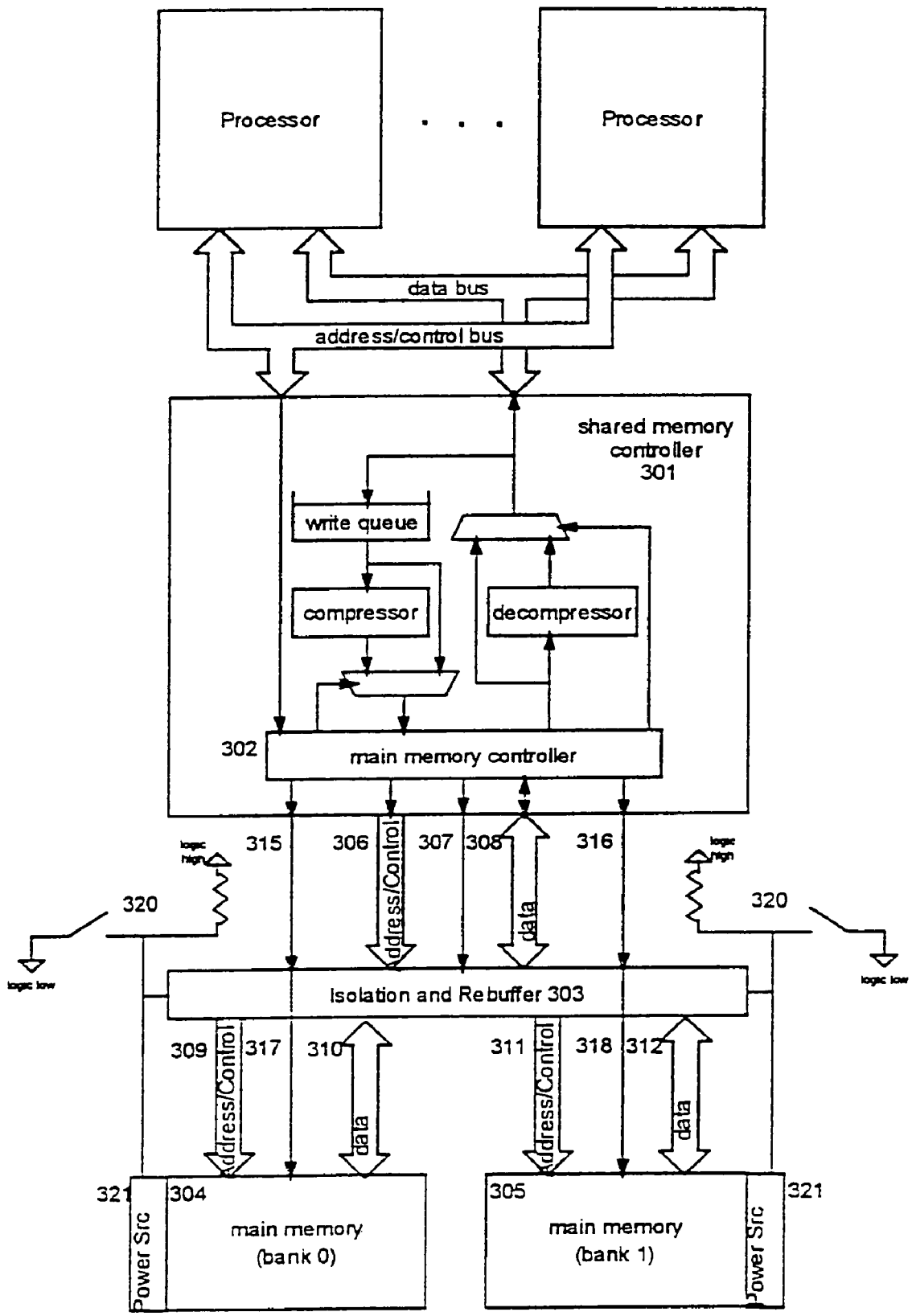
FIG. 3 illustrates the apparatus according to the principals of the present invention.

Referring to FIG. 3, shown is a processing system 300, having a highly reliable and maintainable main memory comprised of redundant memory together with integrated memory compression. This new architecture provides a means to tolerate and repair faults within the main memory, without interruption of application or operating system software operation, and at nearly zero additional cost when the redundant memory cost is offset by the compression efficiency. The memory system, having a main memory array that is configurable as a duplex, where identical content is maintained within each memory bank, such that any uncorrectable data error detected upon read access to a given bank, may be reread from the other bank with the intent of receiving data without error.

Operating the two banks in "lock-step", with all activity occurring simultaneously to both banks, insures the back-up bank is a "mirror image" of the primary bank. All data is received from the primary bank, and all data is stored to both banks. The main memory array is physically packaged into two separate and identical banks 304 and 305 of user replaceable memory. Typically, each bank is comprised of a field replaceable memory circuit card, which contains a quantity of SDRAM packaged as dual in-line memory modules (DIMM's). The memory controller 302 accesses the pair of banks 304 and 305, through a typical memory interface connected to electrical isolation and re-buffer logic 303, which provides an equivalent and separate synchronous memory interface to each bank. The independent logic interfaces protect each bank from potential electrical influences between each other, during removal, replacement or the effects of a fault within a bank.

All memory activity is controlled by state applied on address/control signals 306 (typically SDRAM RAS, CAS, Address, WE, CKE, and necessary data direction control) by the memory controller 302. This state, exclusive of the direction control, is synchronously re-driven on the equivalent address/control signals 309 and 311 to memory banks 304 and 305, respectively. Similarly, any data that is written to the memory is driven as state on the data signals 308 by memory controller 302, which is in turn synchronously re-driven to both memory banks 304 and 305 through signals 310 and 312, respectively. Two independent bank enable signals 315 and 316 provide the means to make either one or both memory banks responsive to the address/control state. These signals are synchronously redriven through 303 to signals 317 and 318 to their respective memory banks.

When the system is configured to operate in "non-duplex" mode, these signals are managed as decoded address bits, such that each bank is enabled exclusive of the other, with one being the low-order and the other being the high order addressable bank. When the system is configured to operate in "duplex" mode, the bank enable signals are always driven with identical state, so that both memory banks are responsive to the same address/control state, and at the same time. The isolation and re-buffer logic 303 always captures the data state from both banks, but synchronously re-drives (to the memory controller interface 308) the state from only one of the two bank data interfaces 310 or 312, selected by the synchronous state of the special bank read select signal 307, driven by memory controller 302. This action occurs regardless of whether one or both banks are responsive to a given state on the address/control signals.

Independent memory bank detect circuits 320, provide a means of detecting when a memory bank field replaceable unit (FRU) is present within the system. These simple switch circuits are responsive to the removal of a FRU, such that the associated power 321 and interfaces 309 and 310 may be disabled before the FRU is electrically disconnected from the system. This prevents any collateral damage to the FRU and surrounding apparatus when the electrical circuits are disconnected. The independent memory bank power sources 321 may be implemented on the FRU assembly, or as an independent "tap" from the main system power source, or other solutions. In any case, the power source must be independently interruptable so as to avoid collateral damage or electrical disruption of other active electrical devices.

Figure 4:
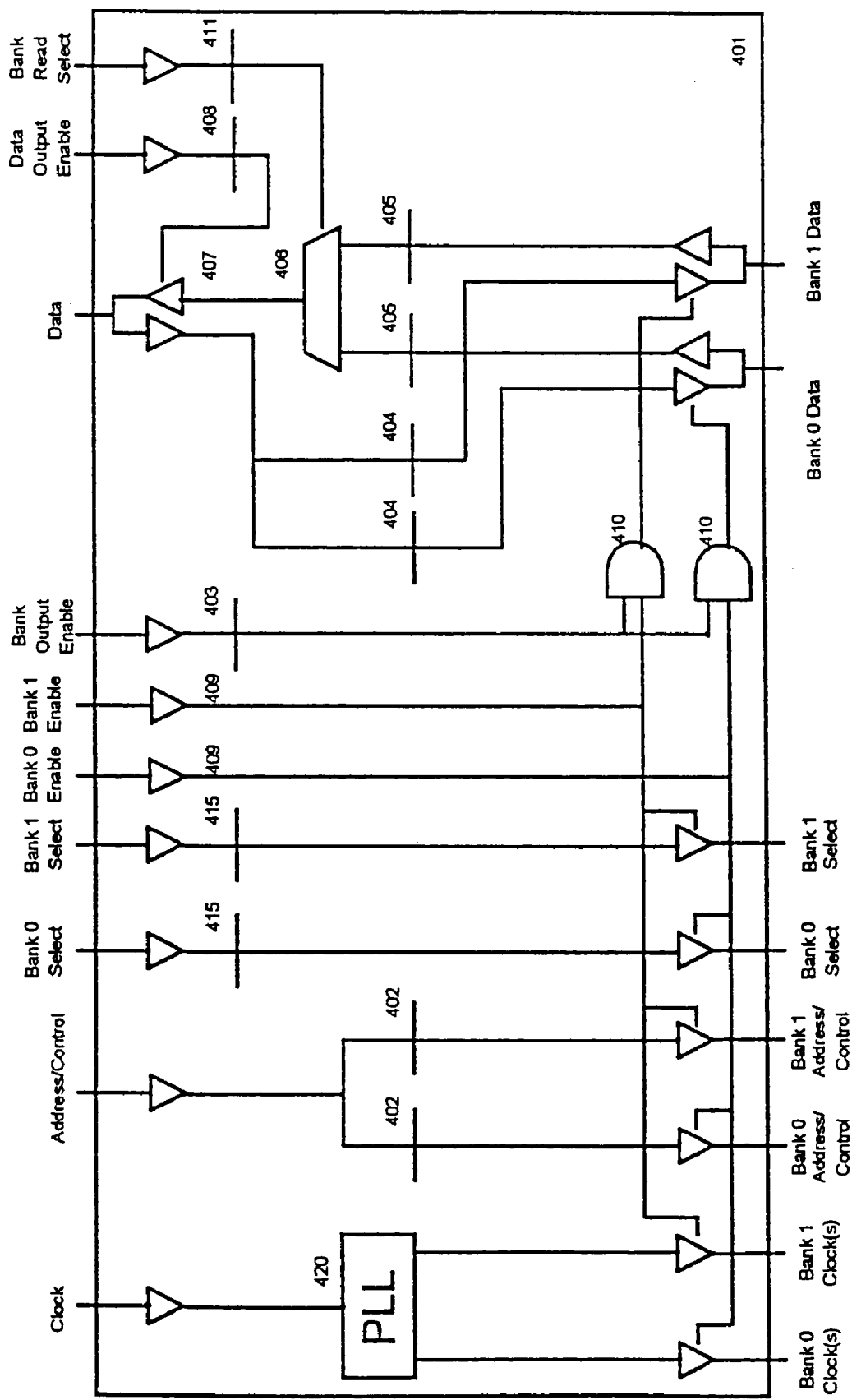
FIG. 4 illustrates an apparatus for selectably isolating memory banks according to the principals of the invention.

Referring now to FIG. 4, shown is a electrical schematic diagram 400 for the typical electrical isolation circuit identified in 303 of FIG. 3. This circuit provides the means to electrically isolate the two memory banks from each other, as well as logically pipeline through registers and re-buffer the signals for the highest performance operation. The independent memory bank detect circuits 320 in FIG. 3 are connected to the respective bank enable control signals 409. When asserted, each of these signals enables the interface signals to be driven to the respective memory banks, otherwise the interface signals are maintained in a high impedance state. The phase-locked-loop (PLL) 420 provides a means to provide phase aligned, bank independent clocks to the memory banks for synchronous operation. Shared memory controller 301 address/control signals 306 are connected to the address/control, bank output enable, data output enable, and bank select signals in FIG. 4. The bi-directional data signals 308 are connected to the same signals in FIG. 4. All these signals are synchronously driven from input to output through respective registers 402, 403, 404, 408, 415 and 405. During memory read access, the shared memory controller selects which bank it will receive data from by asserting the bank read select (307 in FIG. 3) one clock cycle (411) before it intends to capture data from the data signals (308 in FIG. 3).

Referring back to FIG. 3, a programmable register within the memory controller 302 contains control bits to define six modes (defined below) of memory bank utilization within the system. While all modes are user selectable, modes 4-6 permit control hardware modification too. Modes 5 and 6 permit the memory system to tolerate multiple faults across the two banks, as long as they do not exist at the same addresses.

1. Normal operation such that either one or both memory cards are independently addressed and accessed. Bank "0" contains the low order addressed memory and bank "1" contains the high order addressed memory. For a given read access, the bank select signal 307 state corresponds to the addressed bank.

2. Bank "1" mirrors bank "0" such that read and write is to both cards simultaneously, but read data is selected from bank "0", via bank select signal 307. This mode provides a means to logically ignore bank "1", thus permitting bank "1" to be either in or out of the system in support of repair and or replacement.

3. Bank "0" mirrors bank "1" such that read and write is to both cards simultaneously, but read data is selected from bank "1", via bank select signal 307. This mode provides a means to logically ignore bank "0", thus permitting bank "0" to be either in or out of the system in support of repair and or replacement.

4. Bank "1" mirrors bank "0" with automatic fail-over to the mode 3, as selected by bank select signal 307, and retry read after an uncorrectable error (UE) is detected during a read reply. Upon detecting a UE, the memory controller will reclassify the error as a correctable error, and retry the memory read access and any future access with the alternate bank.

5. Bank "1" mirrors bank "0" with automatic fail-over to the mode 6, as selected by bank select signal 307, and retry read after an uncorrectable error (UE) is detected during a read reply. Upon detecting a UE, the memory controller will reclassify the error as a correctable error, and retry the memory read access and any future access with the alternate bank.

6. Bank "1" mirrors bank "0" with automatic fail-over to the mode 5, as selected by bank select signal 307, and retry read after an uncorrectable error (UE) is detected during a read reply. Upon detecting a UE, the memory controller will reclassify the error as a correctable error, and retry the memory read access with the any future access with the alternate bank.

Another register is used to provide user control of new and special functions of the memory scrub hardware within the memory controller 302. These functions are unique and necessary to the operation of duplex memory operation, including:

1. Scrub Immediate—Scrub read and write successive blocks over the entire memory range without regard to a slow pace "background" interval. When used in conjunction with the aforementioned mode 2 or 3, this function provides a means to read all the content of the primary memory bank, validate the data integrity through EDC circuits, and rewrite the data back to both banks, for the purpose of reinitializing the content of the back-up bank from that of the primary bank. Thus, permitting a newly installed "empty" memory to be initialized while the system is in continuous use.

2. Scrub Background—Scrub read (and write only on correctable error) successive blocks over the entire memory range with regard to a slow pace "back ground" interval. This typical scrub operation is enhanced to support duplex-operation by alternating entire memory scrubs between primary bank and back-up banks when modes 4-6 are selected. This prevents the back-up bank from accumulating "soft errors", since data is never actually received from the back-up bank during normal read references.

Lastly, the register programmable memory SDRAM initialization function within the memory controller 302, is enhanced to permit initializing the SDRAM's on the back-up memory bank without affecting operation of the primary bank. While not in mode 1, the memory initialization activity is enabled (via bank select signal 315 or 316) only to the back-up memory bank. Otherwise (mode 1), the initialization activity is always enabled for both banks.

Conventional error detection and correction (EDC) theory is employed (specifically that described in patent application YOR-000-125,) to achieve high integrity memory data. All data words are stored to the memory together with an associated Error Correction Code (ECC), generated by EDC circuits within the memory controller 302. For example, every 128-bit data word is stored with a 16-bit ECC. Any subsequent reference of said data word is integrity checked upon receipt by EDC circuits. Further, the EDC circuits are capable of correcting any corrupted portion of the received data word that is confined to a single symbol (for example 4-bits). This situation is known as a correctable error. When the EDC circuits are incapable of correcting a data word error, it is known as an un-correctable error (UE). Errors of this type usually result with the entire system being taken out of service. When the memory is configured in modes 4 through 6, the memory read controller is responsive to EDC circuit detection of data UE's from the selected memory bank, where special action is taken to reverse the roles of the two memory banks and reread the affected data from the back-up memory bank. Since the back-up bank content always mirrors that of the primary bank, the reread data will be logically identical, except free of the error condition associated with the primary bank.

Figure 5:
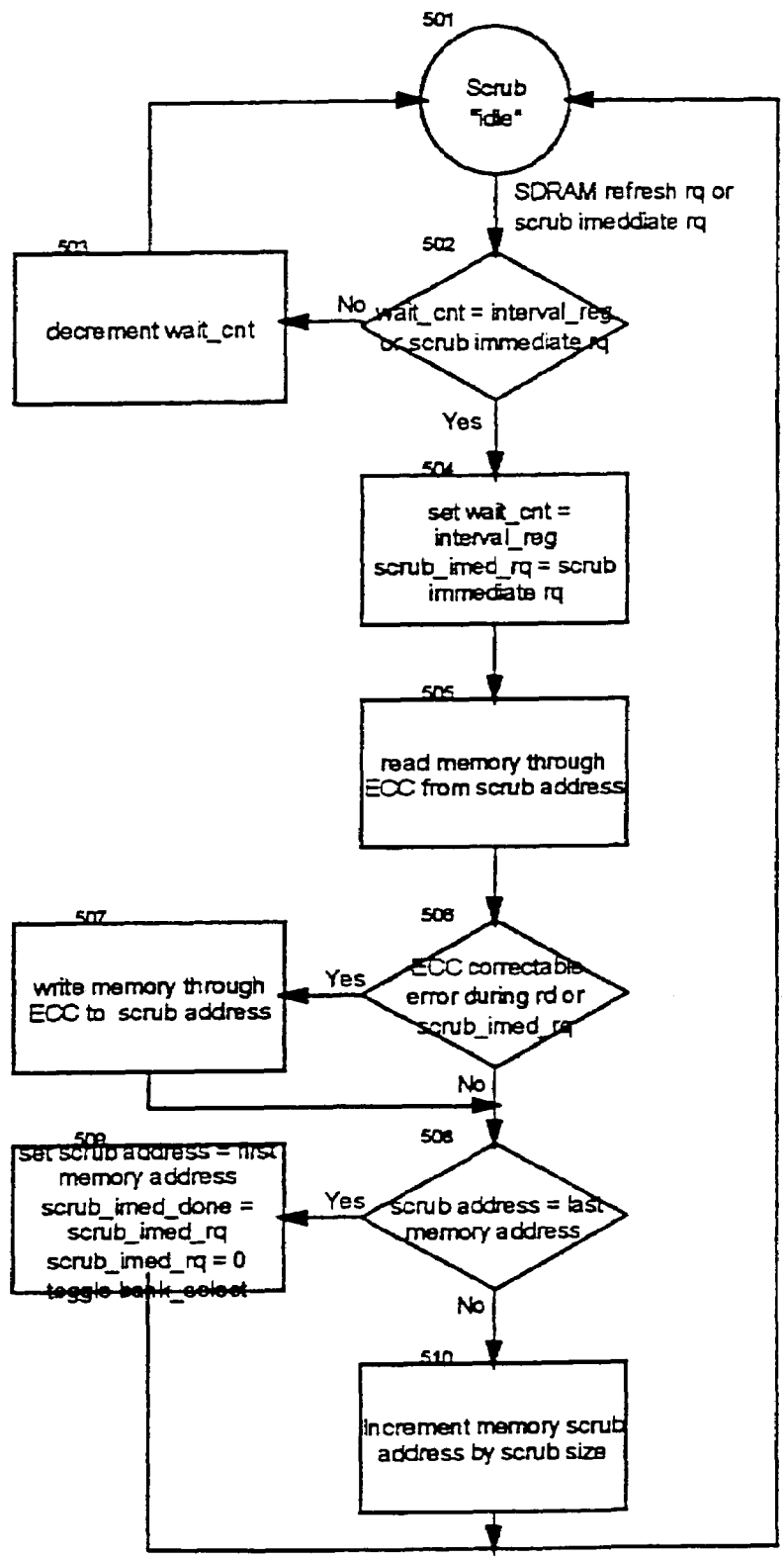
FIG. 5 illustrates the state diagram for the methods of memory initialization and scrub in the presence of the apparatus relating to the present invention.

Referring to FIG. 5, shown is a state diagram of a typical memory scrub process, modified to provide a means for memory initialization and scrub in a duplex memory system. Memory scrub is a process of systematically reading every location of a SDRAM over a period of time for the purpose of detecting accumulated storage errors. If a correctable error is detected by the EDC circuits during a memory read, the corrected data is written back to the SDRAM through the EDC circuits to reestablish the data in memory without errors. Since SDRAM soft errors accumulate slowly, the scrub process needs to complete a sweep of the SDRAM over several tens of hours. Therefore, the scrub process operates in the idle state 501 until some infrequent periodic event, for example some quantity of SDRAM refreshes are detected 502 and 503, initiates a scrub read to the next block of memory. Once out of the wait loop 501, 502 503, a scrub event commences by first reinitializing the wait counter "wait_cnt" 504, to pace out the period to the next scrub.

Then a block of data, say 256 bytes, is read from memory, at the scrub address contained within a counter, and checked through the EDC circuits 505. Any correctable errors detected in the scrub data block from 505, would have been corrected by the EDC circuits before the data was stored into a temporary buffer. If there were any errors 506, then the corrected scrub data block is written back to the main memory 507, otherwise no memory update is required. If the scrub address counter is equal to last memory address 508, then the counter is reinitialized with the first memory address, and the bank select is toggled to target the opposite bank for the aforementioned modes 4-6, 509. Otherwise, the counter is incremented to indicate the next scrub address 510.

Figure 6:
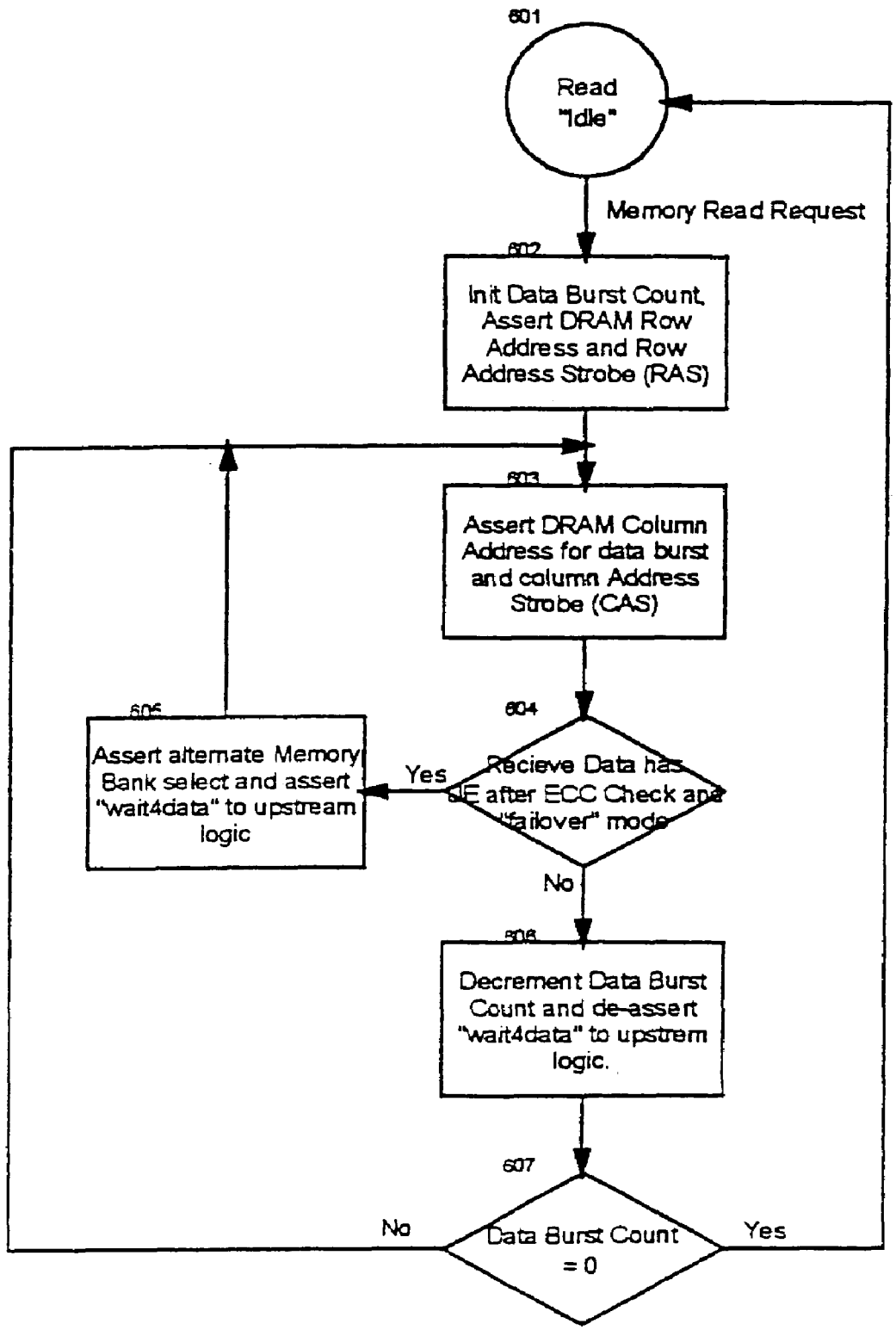
FIG. 6 illustrates the state diagram for the method of memory read access in the presence of the apparatus relating to the present invention.

Referring to FIG. 6, shown is a state diagram of a typical memory read access control process, modified to provide a means to "failover" to the back-up memory bank upon detection of an uncorrectable error with data received from the primary memory bank. While operating in the idle state 601, any memory read access request will result with the initiation of an access to the DRAM memory. At step 602, the DRAM "data burst count" register is initialized to the number of data bursts required to fulfill the read request, and according to the required memory interface protocol, the DRAM "row address" is asserted together with "row address strobe" (RAS) via 306, 309 and 311 in FIG. 3. At the appropriate time thereafter (step 603), the DRAM "column address" and "column address strobe" (CAS) is asserted to the memory via 306, 309 and 311 in FIG. 3. At the predetermined time thereafter, the memory controller captures the data from the DRAM interface (310, 312, and 308 in FIG. 3) and checks the data for correctness through the EDC circuits.

If an uncorrectable error was not detected at step 604, then the "data burst count" is decremented at step 606. When the count is zero at step 607, then the read request has been satisfied and control is returned to the idle state 601, otherwise more data bursts are to be read after control is returned to step 603. If data received back at step 604 has an uncorrectable error, then the memory is reconfigured (back-up bank to primary bank and vise versa) to provide data from the previously back-up bank at step 605, (via bank select 307 in FIG. 3,) before rereading the affected data burst at the associated column address. Special consideration should be afforded to long memory pipelines, where the uncorrectable error may be determined after the memory activity has closed or the next unrelated memory activity has started. In these cases, it may be necessary to modify the read control process to be able to reactivate the memory referenced to.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

Having thus described our invention, what we claim as new, and desire to secure by Letters Patent is:

1. A method to initialize, synchronize, and validate the integrity of a back-up memory bank after replacement, comprising the steps of:

setting a memory initializing control bit to invoke hardware initialization of the back-up memory bank, starting an immediate scrub operation to cause data to be read from a primary memory bank, error checked, and then written to both the primary and back-up memory banks;

starting a background scrub operation with errors inhibited from propagating outside a memory controller; and checking for errors during the scrub operations, and if no errors are found, then re-enabling error reporting outside the memory controller.

2. A method according to claim 1, wherein the checking step includes the step of using error detection and correction circuitry to check for errors during the scrub operations.

3. A method to failover to a back-up memory bank upon detection of an uncorrectable error with data received from a primary memory bank, comprising the steps of:

i) activating both the primary and back-up memory banks;

ii) initiating a read burst to both memory banks;

iii) receiving and checking each data cycle of data burst from the primary memory bank;

iv) if an uncorrectable error is detected, swapping the configuration of the primary and back-up memory banks; wherein the primary memory bank and the back-up memory bank become, respectively, the back-up memory bank and the primary memory bank, and rereading the data burst; and v) repeating steps (ii)-(iv).

4. A method according to claim 3, wherein step (iv) includes the step of reclassifying the error as a correctable error.

* * * * *